United States Patent
Galvin et al.

(10) Patent No.: US 9,152,439 B2
(45) Date of Patent: Oct. 6, 2015

(54) METHOD AND DEVICE FOR CUSTOMIZING SOFTWARE

(75) Inventors: David Benjamin Galvin, San Jose, CA (US); Gerald Koenig, Sunnyvale, CA (US); Frank E. La Fetra, Jr., Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 387 days.

(21) Appl. No.: 13/054,501

(22) PCT Filed: Aug. 5, 2008

(86) PCT No.: PCT/US2008/072229
§ 371 (c)(1),
(2), (4) Date: Jan. 16, 2011

(87) PCT Pub. No.: WO2010/016833
PCT Pub. Date: Feb. 11, 2010

(65) Prior Publication Data
US 2011/0126189 A1    May 26, 2011

(51) Int. Cl.
*G06F 9/45* (2006.01)
*G06F 9/445* (2006.01)

(52) U.S. Cl.
CPC ............ *G06F 9/44547* (2013.01); *G06F 8/61* (2013.01)

(58) Field of Classification Search
None
See application file for complete search history.

(56) References Cited

U.S. PATENT DOCUMENTS

| | | | |
|---|---|---|---|
| 5,991,544 A * | 11/1999 | Godse | 717/167 |
| 6,006,035 A * | 12/1999 | Nabahi | 717/175 |
| 6,177,860 B1 | 1/2001 | Cromer et al. | |
| 6,247,128 B1 * | 6/2001 | Fisher et al. | 713/100 |
| 6,289,510 B1 | 9/2001 | Nakajima | |
| 6,324,619 B1 * | 11/2001 | Raverdy et al. | 717/120 |
| 6,378,128 B1 * | 4/2002 | Edelstein et al. | 717/174 |
| 6,615,287 B1 | 9/2003 | Behrens et al. | |
| 6,631,521 B1 * | 10/2003 | Curtis | 717/175 |
| 6,671,749 B2 * | 12/2003 | Williams et al. | 717/177 |
| 6,687,902 B1 * | 2/2004 | Curtis et al. | 717/175 |

(Continued)

FOREIGN PATENT DOCUMENTS

| | | |
|---|---|---|
| CN | 1300979 A | 6/2001 |
| CN | 1485732 A | 3/2004 |

(Continued)

OTHER PUBLICATIONS

Raza, Bieszczad, "Network Configuration with Plug-and-Play Components", 1999, Proceedings of the Sixth IFIP/IEEE International Symposium on Distributed Management for the Networked Millennium; [retrieved on Jun. 22, 2015]; Retrieved from Internet <URL:http://ieeexplore.ieee.org/stamp/stamp.jsp?tp=&arnumber=770734>;pp. 927-928.*

(Continued)

*Primary Examiner* — Xi D Chen
(74) *Attorney, Agent, or Firm* — Hewlett-Packard Patent Department

(57) ABSTRACT

A method of configuring software on a computer is disclosed herein. The software comprises at least one module and the computer comprises a nonvolatile storage having at least one address. An embodiment of the method comprises loading a flag into the address; reading the flag using the software; and activating the module in the software depending on the state of the flag, wherein activating the module causes at least one program to be installed on the computer.

18 Claims, 3 Drawing Sheets

(56) References Cited

U.S. PATENT DOCUMENTS

| | | | |
|---|---|---|---|
| 6,775,829 B1* | 8/2004 | Kroening | 717/175 |
| 6,778,096 B1 | 8/2004 | Ward et al. | |
| 6,836,794 B1* | 12/2004 | Lucovsky et al. | 709/223 |
| 6,871,344 B2* | 3/2005 | Grier et al. | 717/162 |
| 7,016,944 B1* | 3/2006 | Meyer et al. | 717/177 |
| 7,146,609 B2* | 12/2006 | Thurston et al. | 717/169 |
| 7,228,541 B2* | 6/2007 | Gupton et al. | 717/175 |
| 7,243,346 B1* | 7/2007 | Seth et al. | 717/163 |
| 7,334,226 B2* | 2/2008 | Ramachandran et al. | 717/175 |
| 7,398,524 B2* | 7/2008 | Shapiro | 717/175 |
| 7,418,701 B2* | 8/2008 | Yoda et al. | 717/176 |
| 7,702,740 B2* | 4/2010 | Srinivasan et al. | 717/168 |
| 7,975,266 B2* | 7/2011 | Schneider et al. | 717/178 |
| 8,234,639 B2* | 7/2012 | Ramachandran et al. | 717/174 |
| 8,321,852 B2* | 11/2012 | Shenfield | 717/162 |
| 8,332,843 B2* | 12/2012 | Hasegawa | 717/177 |
| 8,677,348 B1* | 3/2014 | Ramanathpura et al. | 717/175 |
| 2002/0188941 A1* | 12/2002 | Cicciarelli et al. | 717/175 |
| 2003/0037326 A1 | 2/2003 | Burkhardt et al. | |
| 2003/0125815 A1* | 7/2003 | Ghanime et al. | 717/174 |
| 2004/0088697 A1* | 5/2004 | Schwartz et al. | 717/174 |
| 2005/0251797 A1* | 11/2005 | Omiya et al. | 717/165 |
| 2006/0248171 A1* | 11/2006 | Herla et al. | 709/220 |
| 2007/0055969 A1 | 3/2007 | Yang | |
| 2007/0150717 A1 | 6/2007 | Chen | |
| 2007/0150891 A1 | 6/2007 | Shapiro | |
| 2007/0234345 A1* | 10/2007 | Kramer et al. | 717/174 |
| 2007/0245342 A1 | 10/2007 | Lee et al. | |
| 2007/0277029 A1 | 11/2007 | Rao | |
| 2008/0127172 A1* | 5/2008 | Dawson et al. | 717/174 |
| 2008/0222621 A1* | 9/2008 | Knight et al. | 717/151 |
| 2009/0249328 A1* | 10/2009 | Wetherell et al. | 717/175 |
| 2009/0282398 A1* | 11/2009 | Shen et al. | 717/174 |
| 2012/0072902 A1* | 3/2012 | Guo et al. | 717/174 |
| 2012/0198439 A1* | 8/2012 | Kane | 717/177 |
| 2015/0074659 A1* | 3/2015 | Madsen et al. | 717/177 |

FOREIGN PATENT DOCUMENTS

| | | |
|---|---|---|
| CN | 1502075 A | 6/2004 |
| CN | 1949173 A | 4/2007 |
| GB | 2357600 A | 6/2001 |
| JP | 2002108482 | 4/2002 |
| TW | I299451 B | 8/2008 |
| WO | WO 2007/072310 | 6/2007 |

OTHER PUBLICATIONS

Robson, Adam "Data Replication Between two geographically remote sites across a wide area network"; 1992, IEEE Colloquium on Distributed Databases; [retrieved on Jun. 22, 2015]; Retrieved from Internet <URL:http://ieeexplore.ieee.org/stamp/stamp.jsp?tp=&arnumber=241230>;pp. 3/1-3/3.*

Boos, et al., "IBM 3090 Model 200 Processor Complex Installation Notebook"; 1985 IBM; [retrieved on Jun. 22, 2015]; Retrieved from Internet <URL: https://iq.ip.com/preview.html?docid=ipcompad.IPCOM000148615D> pp. 1-121.*

UKIPO, Second Office Action dated Sep. 24, 2012, Application No. 1101293.7 filed Jan. 26, 2011.

WIPO, PCT/US2008/072229, International Search Report, mailed Apr. 14, 2009.

Search Report in Chinese Patent Application No. 200880130648.3, dated Jan. 11, 2013.

Installation (computer programs), Wikipedia, the free encyclopedia, Mar. 8, 2008, pp. 1-4, Available at: <en.wikipedia.org/w/index.php?title=Installation_(computer_programs)&oldid=229645145>.

System Locked Pre-Installation, Wikipedia, the free encyclopedia, Jul. 30, 2008, pp. 1-2, Available at: <en.wikipedia.org/w/index.php?title=System_Locked_Pre-installation&oldid=228896589>.

* cited by examiner

METHOD AND DEVICE FOR CUSTOMIZING SOFTWARE

CROSS-REFERENCE TO RELATED APPLICATION

This application is a national stage application under 35 U.S.C. §371 of PCT/2008/072229, filed Aug. 5, 2008.

BACKGROUND

Many computer manufacturers load programs onto their computers prior to shipping the computers. Some manufacturers provide programs that are customized for a particular market or a particular retailer. Providing these customized programs requires that different programs be loaded onto each computer that is to be shipped to a different market or retailer, which is time consuming and expensive. For example, a first retailer may provide a specific type of antivirus software and a second retailer may provide a second antivirus software on the same computer. At present the two identical computers need to have different programs installed, which is time consuming.

DETAILED DESCRIPTION

Manufacturers may load or install programs on computers prior to shipping the computers. Programs are some times referred to as software. However, in order to avoid confusion, software, as used herein, includes a plurality of programs that are stored in the computer for use by the end user. Many customers and retailers prefer customized programs to be installed by the manufacturer. Some conventional computer systems require different customized programs to be loaded on computers for the different retailers and markets. As described below, the computer system and methods described herein enable a single software package to be loaded on computers sent to different retailers and markets. The software then installs specific programs onto the computer that are customized for a particular retailer and/or market.

In summary, some computers contain memory, such as a nonvolatile memory. During manufacture, flags in the memory are set to indicate the programs or type of programs that are required to be installed on a specific computer. Generic software or a generic software package is then loaded into the computer. The software reads the flags set in the memory to determine the specific software configuration and/or programs that are to be installed in the computer. Modules or the like in the software are activated or inactivated per the flags. For example, the flags may indicate that the computer is to be sold to a certain retailer. The software may activate modules that install programs that reflect offers or the like specific to the retailer. Accordingly, the programs installed on the computer are customized to the retailer.

Figure 1:
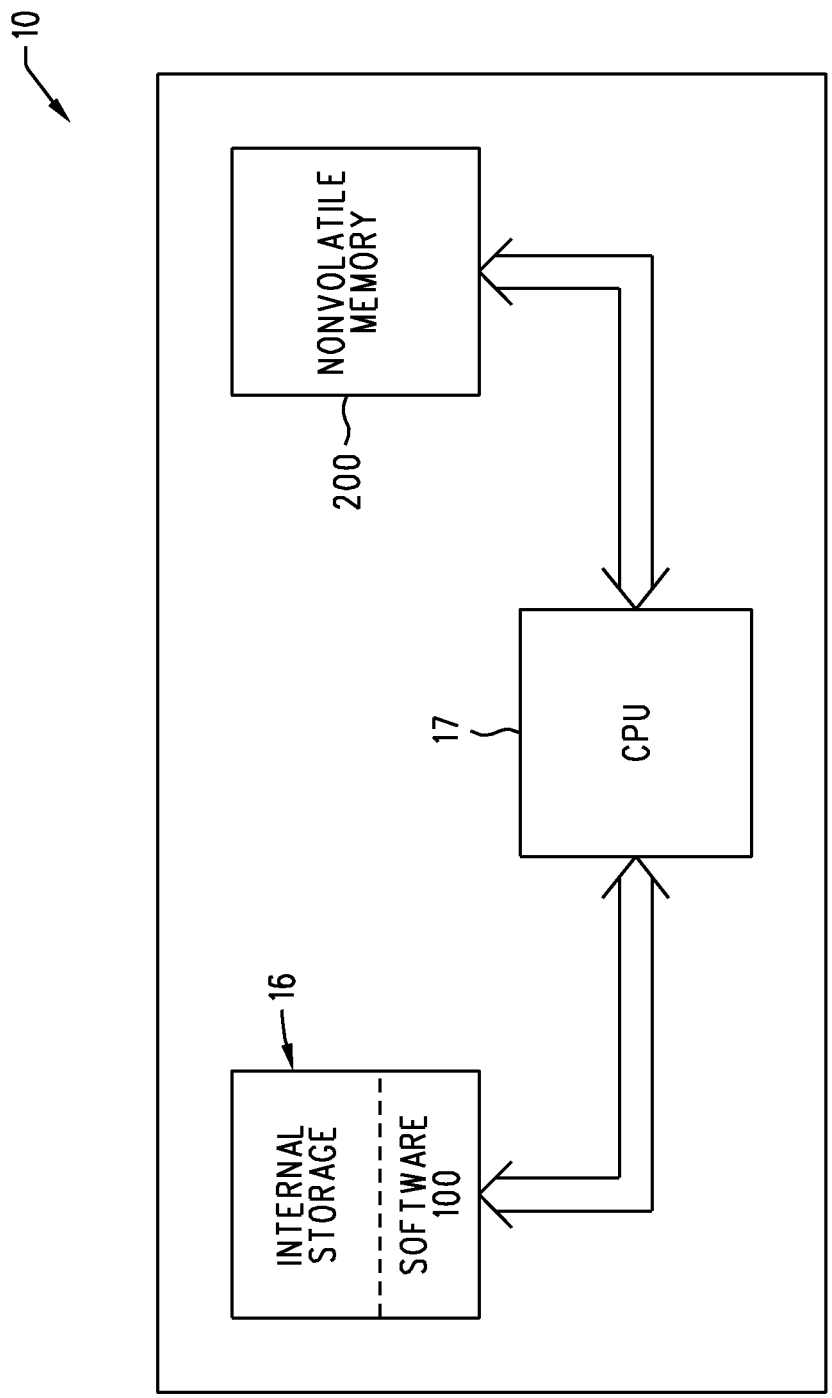
FIG. 1 is a block diagram of a computer system in accordance with an embodiment.

A further description of the technology of the invention will now be described in greater detail. A block diagram of an embodiment of a computer system 10 is shown in FIG. 1. It is noted that the computer system 10 of FIG. 1 is an example of a simplified computer system and that other embodiments of computer systems may be used herein such as, without limitation, multiprocessor computers, servers, network attached servers, personal computers, digital phones, portable display devices, and the like.

Figure 2:
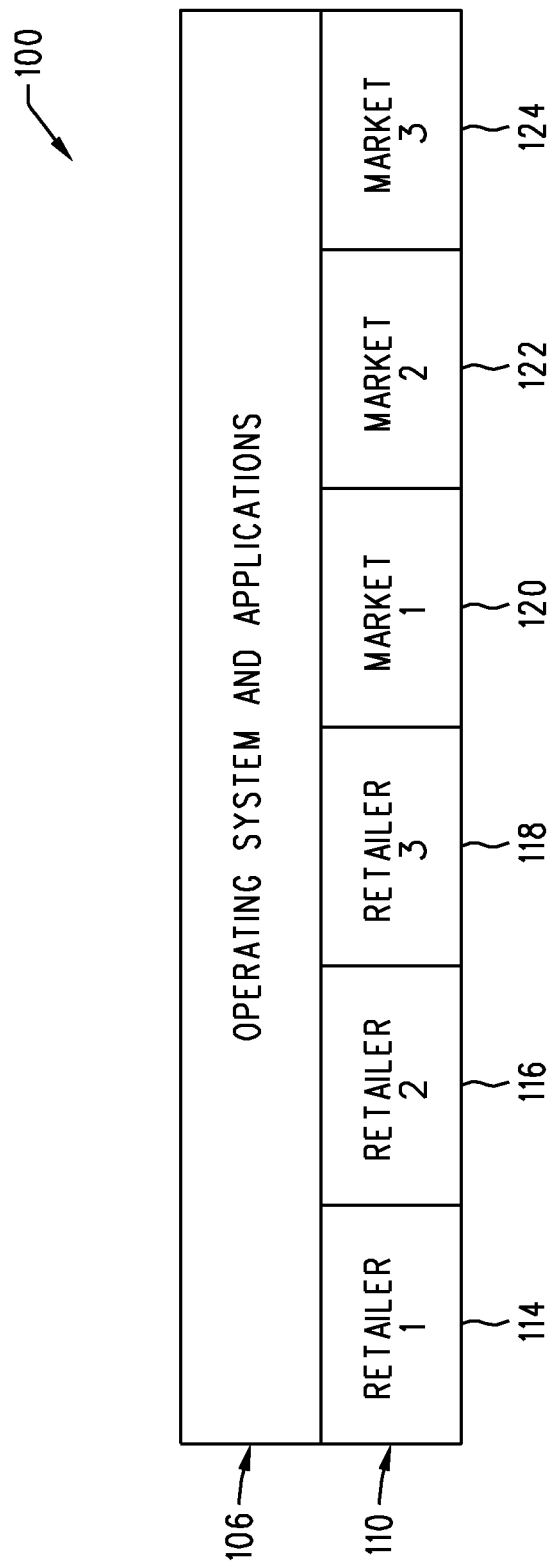
FIG. 2 is a block diagram of an embodiment of software that may be installed onto a computer system.

The computer system 10 includes internal storage 16, a CPU 17, and nonvolatile memory 200. The internal storage may be a hard disc drive, optical disk drive, volatile memory, non-volatile memory or the like, which may store computer programs and software 100 as shown in FIG. 2. The CPU 17 may be virtually any central processing unit, microprocessor, controller, for use in a computer system 10. The CPU 17 serves to execute the programs stored in the internal storage 16. In addition, the CPU 17 may, in some embodiments, read and write to the nonvolatile memory 200.

A block diagram of an embodiment of software 100 is shown in FIG. 2. The software 100 may be a software package including a plurality of different programs and/or modules. The software 100 may includes an operating system and applications 106, which is referred to collectively as simply applications 106. The applications may include browsers, video viewers, anti virus software, ad blocking programs, offers from the retailer, and other programs.

In addition to the applications 106, the software 100 may include a plurality of installation modules or modules 110, each of which is specific to a particular retailer and/or market. The modules 110 serve to customize the software 100 as described in greater detail below. The individual modules are identified as the first retailer 114, the second retailer 116, the third retailer 118, the first market 120, the second market 122, and the third market 124. The retailers reflect different modules in the software related to specific retailers. Likewise, different markets correspond to different market modules that can be loaded into the software. As described in greater detail below, these modules load specific programs into the computer when they are activated.

Figure 3:
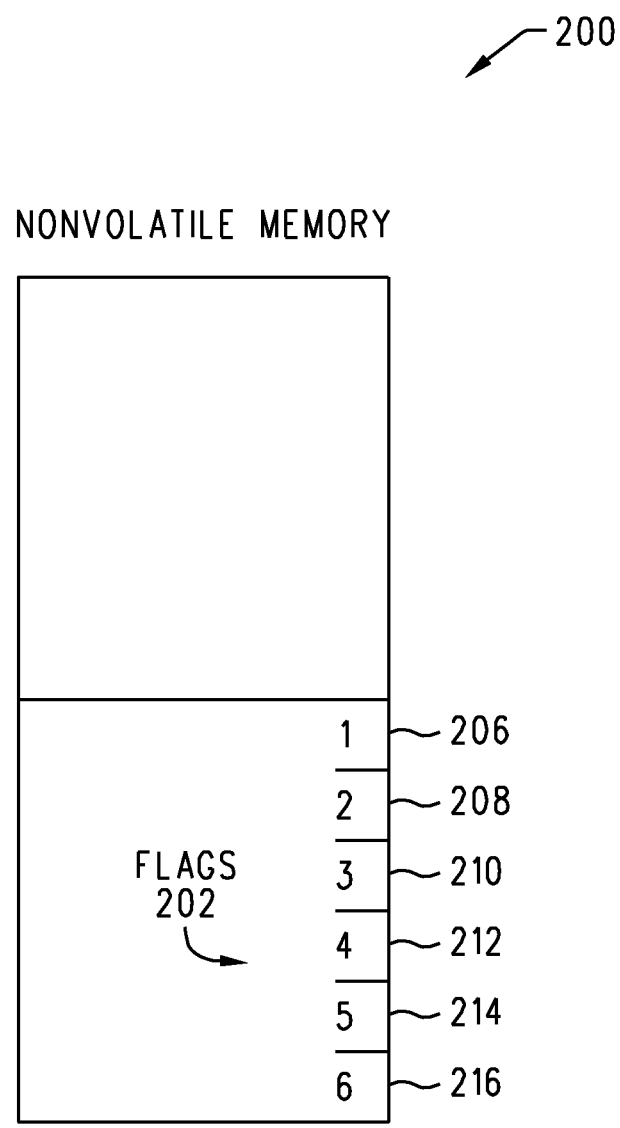
FIG. 3 is a block diagram of an embodiment of a nonvolatile memory that may be used within a computer system.

With additional reference to FIG. 3, the computer in which the software 100 is loaded includes a nonvolatile memory 200 or nonvolatile storage. The nonvolatile memory 200 may, as an example, include a BIOS (basic input/output system) code or other such firmware. In other embodiments, the nonvolatile storage may be a USB (universal serial bus) device. The nonvolatile memory 200 has flags or other indicators loaded therein that serve to ultimately instruct the software 100 as to which modules to activate or programs to load. In some embodiments, the flags are set within the DMI portion of the BIOS and serve to instruct the software as to the modules to be installed. The flags may be, or correspond to, addresses within the nonvolatile memory 200.

In an embodiment of the nonvolatile memory 200 of FIG. 3, there are six flags stored therein, which are referred to individually as the first flag 206, the second flag 208, the third flag 210, the fourth flag 212, the fifth flag 214, and the sixth flag 216. The flags may be set at the time the computer is manufactured. For example, the nonvolatile memory 200 may be manufactured with the flags set and then the entire memory 200 is installed into the computer. In other embodiments, the flags may be set subsequent to manufacture.

During installation of the software 100, the software reads the has 202 in order to determine which of the modules 110 are to be loaded or activated. For example, if the first flag 206 is set, the software 100 may install or activate the first retailer module 114. Likewise, if the second flag 208 is set, the second retailer module 116 may be installed. With regard to the market modules, the first market module 120 may be installed if the fourth flag 212 is set. Likewise, the second market module 122 may be installed if the fifth flag 214 is set. When a module is installed or activated, certain programs are installed on the computer.

In practice, a retailer may order a plurality of computers from a manufacturer. The retailer may want the installed programs to be customized for the retailer. As an example, the retailer may want to sell the computer with certain programs installed, such as certain word processors or games. The installed programs may further cause screen backgrounds to display logos of the first retailer or information regarding upgrades and service provided by the first retailer.

By setting the first flag 206, the first retailer is identified during installation of the software 100 and the first retailer module 114 of software is installed or activated. In some embodiments, the modules 110 do not actually install, but instruct the software to install certain programs. Thus, the first retailer module 114 may contain instructions for installing certain programs. The first module 114 or other portions of the software may also contain instructions for deleting unused software or programs in the software 100 that were not installed.

With regard to the market modules, the software 100 may install programs or the like depending on the intended customer market related to the sale of the computer. The market may include seasonal promotions, and other such market criteria. In one example, a retailer may want to sell computers to younger users. In this market, the fourth flag 212 could be set, which causes the software 100, when operational, to activate the first market module 120. The first market module 120 may cause the software 100 to install programs and the like directed toward younger users, such as programs related to firewalls or Internet monitoring programs.

If the retailer wants to sell computers to a different market, it may set the fifth flag 214. The fifth flag 214 may cause the second market module 122 to activate and install programs directed toward a different market. For example, the fifth flag may cause programs meant for business computers to be installed.

In some embodiments, the markets may be seasonal, regional, or based on of criteria. For example, one of the market flags may indicate that the computer is to be sold for the Christmas holiday. In such an embodiment, programs associated with Christmas or winter may be loaded. Another market flag may indicate that the computer is to be sold during back to school promotions. A market module may cause programs directed to students to be installed.

In more elaborate embodiments, a retailer flag and a marketing flag may both be set. A retailer may want to sell computers in a specific market, such as to the business market. In such an embodiment, the first flag 206 may be set to indicate that the first retailer is selling the computer. The fourth flag 212 may also be set to indicate that the market is to business users. The first flag 206 causes the first retailer module 114 to activate, which causes programs unique or customized for the first retailer to be installed. These programs may include logos, technical assistance contacts, and other information that is unique to the first retailer. The fourth flag 212 may cause the first market module to install programs for business computers. These programs may include certain accounting software and the like. If the first retailer is selling a computer in the student market, the fifth flag 214 may be activated to cause the second market module 122 to install student related programs.

Having described the software 100 and the nonvolatile memory 200, the assembly of a computer using the software 100 will now be described.

A retailer or manufacturer may write the software 100 that includes all the programs that are to be installed in a plurality of different computers. Modules 110 or the like within the software determine which programs are to be installed. Thus activation of a first module will cause a first plurality of programs to be installed. The software 100 looks to or accesses nonvolatile memory 200 within the computer to determine which modules are to be activated during the software installation. More specifically, the software 100 may read the flags 202 as described above.

The manufacture receives orders from the retailer regarding the type of programs that are to be installed on specific computers. Based on the order from the retailer, the manufacturer installs nonvolatile memory 200 with the flags 202 set so as to activate the appropriate modules in the software 100. In other embodiments, the nonvolatile memory 200 is installed and the appropriate flags are programmed into the nonvolatile memory 200. In some embodiments, a data cable or the like is connected to the computer to program the nonvolatile memory 200.

The software 100 is loaded into the computer. During initialization or installation of the software 100, the software 100 reads the flags in the nonvolatile memory 200 to determine which modules 110 are to be activated so that the correct programs are installed. It is noted that when the software 100 or programs are loaded in the computer, they are not necessarily installed. Installed software or programs as used herein refers to software or programs that may be readily executed by the computer. The software 100 runs as described above to install the correct programs. In some embodiments, programs that are not installed are deleted.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
reading a plurality of flags from a nonvolatile storage of a computer using software on said computer, said software comprising a plurality of installation modules and a plurality of programs, each of said installation modules including instructions to load a respective at least one of said plurality of programs into said computer, at least one of said plurality of flags being in a set state indicating selection of at least one of said installation modules for activation;
activating a first installation module of said installation modules that corresponds to a set flag of said plurality of flags, and not activating a second installation module of said installation modules that corresponds to an unset flag of said plurality of flags, wherein activating said first installation module causes said first installation module to instruct installation of a respective subset of said plurality of programs into said computer;
activating another of said plurality of installation modules that corresponds to another set flag of said plurality of flags; and
installing, by said activated another installation module, another subset of said plurality of programs.

2. The method of claim 1, wherein said nonvolatile storage includes a storage to store basic input/output system (BIOS) code.

3. The method of claim 1, wherein said first installation module is specific to a retailer of said computer.

4. The method of claim 1, wherein said first installation module is specific to a market of said computer.

5. The method of claim 1, further comprising deleting a program not installed in said computer following activating of said first installation module.

6. The method of claim 1, further comprising installing, by said activated first installation module, multiple associated programs of said plurality of programs.

7. The method of claim 1, wherein the installed subset of said plurality of programs includes one or multiple programs.

8. The method of claim 1, wherein said plurality of programs include at least one selected from among an operating system program and an application program.

9. A computer comprising:
  a processing unit;
  internal storage to store software comprising a plurality of installation modules and a plurality of programs, each of said installation modules including instructions to load a respective at least one of said plurality of programs into said computer; and
  a nonvolatile memory to store a plurality of flags associated with said installation modules, the software when executed causes said processing unit, to:
    read said plurality of flags stored in said nonvolatile memory, at least one of said plurality of flags being in a set state indicating selection of at least one of said installation modules for activation;
    activate a first installation module of said installation modules that corresponds to a set flag of said plurality of flags, and not activating a second installation module of said installation modules that corresponds to an unset flag of said plurality of flags, wherein activating said first installation module causes said first installation module to instruct installation of a respective subset of said plurality of programs into said computer; and
    activate another of said plurality of installation modules that corresponds to another set flag of said plurality of flags, to cause installation of another subset of said plurality of programs.

10. The computer of claim 9, wherein said nonvolatile memory includes a storage to store basic input/output system (BIOS) code.

11. The computer of claim 9, wherein said first installation module is specific to a retailer of said computer.

12. The computer of claim 9, wherein said first installation module is specific to a market of said computer.

13. The computer of claim 9, wherein said software when executed causes said processing unit to delete a program not installed in said computer following the activating of said first installation module.

14. A non-transitory computer-readable storage medium storing code that upon execution causes a computer to:
  store software in said computer, wherein said software comprises a plurality of installation modules and a plurality of programs;
  read a plurality of flags stored in a nonvolatile memory, said plurality of flags corresponding to said plurality of installation modules, each of said installation modules including instructions to load a respective at least one of a plurality of programs into said computer, at least one of said plurality of flags being in a set state indicating selection of at least one of said installation modules for activation; and
  activate a first installation module of said plurality of installation modules that corresponds to a set flag of said plurality of flags, and not activating a second installation module of said plurality of installation modules that corresponds to an unset flag;
  instruct, by said activated first installation module, installation of one or more associated programs of said plurality of programs into said computer; and
  activate another of said plurality of installation modules that corresponds to another set flag of said plurality of flags, to cause installation of one or more further programs of said plurality of programs.

15. The non-transitory computer-readable storage medium of claim 14, wherein the code upon execution causes said computer to delete a program not installed in said computer following activating of said first installation module.

16. The non-transitory computer-readable storage medium claim 14, wherein said nonvolatile memory includes a memory to store basic input/output system (BIOS) code.

17. The non-transitory computer-readable storage medium of claim 14, wherein said first installation module is associated with at least one program that is specific to a retailer of said computer.

18. The non-transitory computer-readable storage medium of claim 14, wherein said first installation module is associated with at least one program specific to a market of said computer.

* * * * *

UNITED STATES PATENT AND TRADEMARK OFFICE
CERTIFICATE OF CORRECTION

PATENT NO. : 9,152,439 B2
APPLICATION NO. : 13/054501
DATED : October 6, 2015
INVENTOR(S) : David Benjamin Galvin et al.

It is certified that error appears in the above-identified patent and that said Letters Patent is hereby corrected as shown below:

In the claims

In column 6, lines 37-38 approx., in Claim 16, delete "method claim" and insert -- medium of claim --, therefor.

Signed and Sealed this
Ninth Day of August, 2016

Michelle K. Lee
*Director of the United States Patent and Trademark Office*